(12) United States Patent
Pineau (10) Patent No.: US 7,916,322 B2
(45) Date of Patent: Mar. 29, 2011

(54) METHOD AND APPARATUS FOR UPLOADING CONTENT FROM A DEVICE TO A REMOTE NETWORK LOCATION

(75) Inventor: Richard A. Pineau, No. Andover, MA (US)

(73) Assignee: Senshin Capital, LLC, Wilmington, DE (US)

( * ) Notice: Subject to any disclaimer, the term of this patent is extended or adjusted under 35 U.S.C. 154(b) by 1091 days.

(21) Appl. No.: 10/099,339

(22) Filed: Mar. 14, 2002

(65) Prior Publication Data

US 2003/0184793 A1   Oct. 2, 2003

(51) Int. Cl.
*G06F 3/12* (2006.01)
*G06F 15/16* (2006.01)
*G06K 15/00* (2006.01)

(52) U.S. Cl. .................. 358/1.15; 358/1.16; 709/203
(58) Field of Classification Search ............... 348/211.2, 348/207.99; 358/1.15, 1.16; 710/33; 707/7
See application file for complete search history.

(56) References Cited

U.S. PATENT DOCUMENTS

| | | | |
|---|---|---|---|
| 661,504 A | 11/1900 | Ehlman | |
| 1,251,766 A | 1/1918 | Gindele | |
| 1,524,508 A | 11/1922 | Cohen | |
| 2,590,678 A | 3/1952 | Caim | |
| 2,854,903 A | 10/1958 | Land et al. | |
| 2,930,301 A | 3/1960 | Land et al. | |
| 3,047,387 A | 7/1962 | Land | |
| 3,079,849 A | 3/1963 | Wareham | |
| 3,183,809 A | 5/1965 | Nerwin | |
| 3,270,653 A | 9/1966 | Bachelder | |
| 3,283,683 A | 11/1966 | Land | |
| 3,314,792 A | 4/1967 | Land | |
| 3,405,619 A | 10/1968 | Land | |
| 3,455,692 A | 7/1969 | Bachelder et al. | |
| 3,631,773 A | 1/1972 | Moodie et al. | |
| 3,636,845 A | 1/1972 | Harvey | |
| 3,643,570 A | 2/1972 | Reid et al. | |
| 3,673,939 A | 7/1972 | Harvey | |

(Continued)

FOREIGN PATENT DOCUMENTS

DE    2657423    12/1976

(Continued)

OTHER PUBLICATIONS

"Ready for photos on your phone?", by Ben Charny, dated Feb. 25, 2002, CNET News.com.

(Continued)

*Primary Examiner* — Edward L Coles
*Assistant Examiner* — Vincent Rudolph
(74) *Attorney, Agent, or Firm* — Woodcock Washburn LLP (57) ABSTRACT

Techniques are disclosed for uploading content (such as a digital photograph) from a content upload device to a content server over a communications network, and for automatically forwarding the content from the content server to one or more remote destinations. A user of the content upload device may cause the content upload device to upload the content to the content server by initiating a single action, such as pressing a single button on the content upload device, and without providing information identifying the user to the content upload device. Upon receiving the content, the content server may add the content to a queue, referred to as a content outbox, associated with the user. The content server may automatically forward the content in the user's content outbox to one or more remote destinations specified by preferences associated with the user's content outbox.

36 Claims, 5 Drawing Sheets

U.S. PATENT DOCUMENTS

| | | | |
|---|---|---|---|
| 3,754,917 | A | 8/1973 | Harvey |
| 3,767,405 | A | 10/1973 | Harvey |
| 3,852,781 | A | 12/1974 | Erlichman |
| 3,939,781 | A | 2/1976 | Adams |
| 4,114,166 | A | 9/1978 | Driscoll et al. |
| 4,129,377 | A | 12/1978 | Miyamoto et al. |
| 4,132,471 | A | 1/1979 | Svatek et al. |
| 4,172,647 | A | 10/1979 | Gold |
| 4,200,383 | A | 4/1980 | Bendoni et al. |
| 4,212,528 | A | 7/1980 | Mason |
| 4,248,510 | A | 2/1981 | Baker et al. |
| 4,291,966 | A | 9/1981 | Bendoni et al. |
| 4,370,045 | A | 1/1983 | Holmes |
| 4,488,794 | A | 12/1984 | Dolgow et al. |
| 4,569,578 | A | 2/1986 | Stella et al. |
| 4,605,608 | A | 8/1986 | Bullitt |
| 4,660,951 | A | 4/1987 | Reed et al. |
| 4,693,576 | A | 9/1987 | Chen |
| 4,829,524 | A | 5/1989 | Yoshida |
| 4,855,769 | A | 8/1989 | Slavitter et al. |
| 4,884,088 | A | 11/1989 | Mauchan |
| 4,951,073 | A | 8/1990 | Slavitter |
| 4,962,398 | A | 10/1990 | Sorg et al. |
| 5,001,502 | A | 3/1991 | Douglas |
| 5,023,636 | A | 6/1991 | Douglas |
| 5,040,009 | A | 8/1991 | Mizuno |
| 5,049,910 | A | 9/1991 | Hsiung |
| 5,073,464 | A | 12/1991 | Osawa et al. |
| 5,103,249 | A | 4/1992 | Keene |
| 5,176,224 | A | 1/1993 | Spector |
| 5,285,894 | A | 2/1994 | Kamata et al. |
| 5,292,612 | A | 3/1994 | Polizzotto et al. |
| 5,440,366 | A | 8/1995 | Reiss et al. |
| 5,453,804 | A | 9/1995 | Norris et al. |
| 5,673,190 | A | 9/1997 | Kahleck et al. |
| 5,694,484 | A | 12/1997 | Cottrell et al. |
| 5,742,905 | A | 4/1998 | Pepe et al. |
| 5,757,976 | A | 5/1998 | Shu |
| 5,768,583 | A * | 6/1998 | Orzol et al. ................ 713/1 |
| 5,787,237 | A | 7/1998 | Reilly |
| 5,799,219 | A | 8/1998 | Moghadam et al. |
| 5,806,005 | A | 9/1998 | Hull et al. |
| 5,838,999 | A | 11/1998 | Norris |
| 5,854,882 | A | 12/1998 | Wang |
| 5,855,007 | A | 12/1998 | Jovicic et al. |
| 5,859,628 | A | 1/1999 | Ross et al. |
| 5,870,633 | A | 2/1999 | Norris |
| 5,894,546 | A | 4/1999 | Yoshida |
| 5,973,731 | A | 10/1999 | Schwab ................ 348/161 |
| 5,978,559 | A * | 11/1999 | Quinion ................ 358/1.15 |
| 5,991,290 | A | 11/1999 | Malik |
| 5,995,239 | A | 11/1999 | Kagawa et al. |
| 6,032,180 | A | 2/2000 | Nishikawa |
| 6,043,898 | A | 3/2000 | Jacobs |
| 6,067,532 | A | 5/2000 | Gebb |
| 6,072,595 | A | 6/2000 | Yoshiura et al. |
| 6,076,068 | A | 6/2000 | DeLapa et al. |
| 6,128,415 | A | 10/2000 | Hultgren, III et al. |
| 6,134,450 | A | 10/2000 | Nordeman |
| 6,166,729 | A | 12/2000 | Acosta et al. ................ 345/327 |
| 6,167,469 | A | 12/2000 | Safai et al. |
| 6,202,096 | B1 | 3/2001 | Williams et al. |
| 6,215,561 | B1 | 4/2001 | Kakutani |
| 6,241,673 | B1 | 6/2001 | Williams |
| 6,275,104 | B1 | 8/2001 | Holter |
| 6,298,164 | B1 | 10/2001 | Susuki |
| 6,314,476 | B1 | 11/2001 | Ohara |
| 6,351,776 | B1 | 2/2002 | O'Brien et al. ................ 709/245 |
| 6,356,356 | B1 * | 3/2002 | Miller et al. ................ 358/1.15 |
| 6,381,660 | B1 | 4/2002 | Ito |
| 6,397,261 | B1 | 5/2002 | Eldridge et al. |
| 6,445,694 | B1 | 9/2002 | Swartz |
| 6,453,127 | B2 | 9/2002 | Wood et al. |
| 6,473,498 | B1 * | 10/2002 | Foth ................ 379/93.09 |
| 6,526,416 | B1 | 2/2003 | Long |
| 6,553,240 | B1 | 4/2003 | Dervarics |
| 6,570,640 | B1 | 5/2003 | Garfinkle et al. ................ 355/40 |
| 6,594,032 | B1 | 7/2003 | Hiroki et al. |
| 6,623,527 | B1 | 9/2003 | Hamzy |
| 6,633,635 | B2 | 10/2003 | Kung et al. |
| 6,636,259 | B1 * | 10/2003 | Anderson et al. ................ 348/211.3 |
| 6,657,702 | B1 * | 12/2003 | Chui et al. ................ 355/40 |
| 6,662,231 | B1 | 12/2003 | Drosset et al. |
| 6,671,063 | B1 | 12/2003 | Iida |
| 6,674,539 | B1 | 1/2004 | Serra et al. |
| 6,715,003 | B1 * | 3/2004 | Safai ................ 710/33 |
| 6,725,051 | B2 | 4/2004 | Fidler |
| 6,744,528 | B2 | 6/2004 | Picoult et al. |
| 6,748,569 | B1 | 6/2004 | Brooke et al. |
| 6,757,900 | B1 | 6/2004 | Burd et al. |
| 6,785,022 | B1 | 8/2004 | Todaka |
| 6,785,542 | B1 | 8/2004 | Blight et al. |
| 6,792,577 | B1 | 9/2004 | Kimoto |
| 6,795,205 | B1 | 9/2004 | Gacek |
| 6,795,852 | B1 | 9/2004 | Kleinrock et al. |
| 6,804,534 | B2 | 10/2004 | Lai et al. |
| 6,804,789 | B2 | 10/2004 | Shimizu |
| 6,823,457 | B1 | 11/2004 | Berstis et al. |
| 6,823,526 | B2 | 11/2004 | Howard et al. |
| 6,831,682 | B1 | 12/2004 | Silverbrook et al. |
| 6,847,334 | B2 | 1/2005 | Hayhurst et al. |
| 6,856,412 | B1 | 2/2005 | Kaneko |
| 6,892,069 | B1 * | 5/2005 | Flynn ................ 455/432.1 |
| 6,892,199 | B2 * | 5/2005 | Hong et al. ................ 707/7 |
| 6,906,810 | B2 | 6/2005 | Senay et al. |
| 6,922,258 | B2 | 7/2005 | Pineau |
| 6,931,432 | B1 | 8/2005 | Yoshida |
| 6,931,600 | B1 | 8/2005 | Pittman |
| 6,937,365 | B2 | 8/2005 | Gorian et al. |
| 6,938,079 | B1 | 8/2005 | Anderson et al. |
| 6,947,995 | B2 | 9/2005 | Chang et al. |
| 6,976,084 | B2 | 12/2005 | Pineau et al. |
| 6,980,305 | B2 | 12/2005 | Martinez |
| 6,993,662 | B2 | 1/2006 | Rubin et al. |
| 7,006,242 | B2 | 2/2006 | Smith, II et al. |
| 7,010,695 | B1 | 3/2006 | Mizuguchi |
| 7,016,062 | B2 | 3/2006 | Ishizuka |
| 7,068,846 | B1 | 6/2006 | Yaguchi |
| 7,073,119 | B2 | 7/2006 | Matsubayashi et al. |
| 7,092,119 | B1 | 8/2006 | Hinds et al. |
| 7,099,042 | B2 | 8/2006 | Yaguchi |
| 7,103,905 | B2 | 9/2006 | Novak |
| 7,142,317 | B2 | 11/2006 | Naito et al. |
| 7,143,141 | B1 | 11/2006 | Morgan et al. |
| 7,162,518 | B2 | 1/2007 | Takahashi |
| 7,162,691 | B1 | 1/2007 | Chatterjee et al. |
| 7,190,481 | B2 | 3/2007 | Hirabayashi |
| 7,206,806 | B2 | 4/2007 | Pineau |
| 7,210,099 | B2 | 4/2007 | Rohrabaugh et al. |
| 7,233,408 | B2 | 6/2007 | Henderson et al. |
| 7,260,637 | B2 | 8/2007 | Kato |
| 7,272,390 | B1 | 9/2007 | Adachi et al. |
| 7,272,788 | B2 * | 9/2007 | Anderson et al. ................ 715/210 |
| 7,281,034 | B1 | 10/2007 | Eyal |
| 7,286,251 | B2 | 10/2007 | Tomida et al. |
| 7,355,732 | B2 | 4/2008 | Yamaguchi |
| 7,383,321 | B2 | 6/2008 | Moyer |
| 7,464,134 | B2 | 12/2008 | Simpson et al. |
| 2001/0021664 | A1 | 9/2001 | Kikinis |
| 2001/0042010 | A1 | 11/2001 | Hassell |
| 2001/0052942 | A1 * | 12/2001 | MacCollum et al. ................ 348/333.01 |
| 2001/0054066 | A1 | 12/2001 | Spitzer |
| 2001/0054106 | A1 * | 12/2001 | Anderson et al. ................ 709/227 |
| 2001/0056550 | A1 * | 12/2001 | Lee ................ 713/201 |
| 2002/0040332 | A1 | 4/2002 | Maari et al. |
| 2002/0042884 | A1 | 4/2002 | Wu et al. |
| 2002/0051197 | A1 * | 5/2002 | Minegishi ................ 358/1.15 |
| 2002/0062406 | A1 | 5/2002 | Chang et al. |
| 2002/0075510 | A1 | 6/2002 | Martinez |
| 2002/0077974 | A1 | 6/2002 | Oritz |
| 2002/0078160 | A1 | 6/2002 | Kemp et al. |
| 2002/0078352 | A1 | 6/2002 | Angwin et al. |
| 2002/0091527 | A1 | 7/2002 | Shiau |
| 2002/0100802 | A1 | 8/2002 | Sehr |
| 2002/0104099 | A1 | 8/2002 | Novak |
| 2002/0161856 | A1 | 10/2002 | Strange |
| 2002/0163895 | A1 * | 11/2002 | Haller et al. ................ 370/335 |

| | | | |
|---|---|---|---|
| 2002/0169002 A1 | 11/2002 | Imbrie et al. | |
| 2002/0169851 A1 | 11/2002 | Weathersby et al. | |
| 2002/0171857 A1 | 11/2002 | Hisatomi et al. | |
| 2002/0174205 A1 | 11/2002 | Nakashima | |
| 2002/0184302 A1 | 12/2002 | Prueitt | |
| 2002/0184378 A1 | 12/2002 | Pineau et al. | |
| 2002/0186404 A1* | 12/2002 | Gragg | 358/1.15 |
| 2002/0188673 A1 | 12/2002 | Gimson | |
| 2003/0002072 A1* | 1/2003 | Berkema et al. | 358/1.15 |
| 2003/0004859 A1 | 1/2003 | Shaw et al. | |
| 2003/0005050 A1 | 1/2003 | Pineau et al. | |
| 2003/0037076 A1 | 2/2003 | Bravery et al. | |
| 2003/0069780 A1 | 4/2003 | Hailwood et al. | |
| 2003/0081788 A1 | 5/2003 | Simpson et al. | |
| 2003/0084016 A1 | 5/2003 | Norgaard et al. | |
| 2003/0090707 A1 | 5/2003 | Simpson et al. | |
| 2003/0093756 A1 | 5/2003 | Behzadi et al. | |
| 2003/0105887 A1 | 6/2003 | Cox et al. | |
| 2003/0107529 A1 | 6/2003 | Hayhurst et al. | |
| 2003/0115250 A1 | 6/2003 | Bernier et al. | |
| 2003/0149573 A1 | 8/2003 | Lynton | |
| 2004/0010540 A1 | 1/2004 | Puri et al. | |
| 2004/0019628 A1 | 1/2004 | Piuri | |
| 2004/0201613 A1 | 10/2004 | Simpson et al. | |
| 2004/0201709 A1* | 10/2004 | McIntyre et al. | 348/211.2 |
| 2005/0024499 A1 | 2/2005 | Luciano et al. | |
| 2005/0231761 A1 | 10/2005 | Pineau | |
| 2005/0235202 A1 | 10/2005 | Chen et al. | |
| 2008/0278751 A1 | 11/2008 | Moyer | |

FOREIGN PATENT DOCUMENTS

| | | |
|---|---|---|
| EP | 0 598 513 | 5/1994 |
| EP | 0 738 956 | 10/1996 |
| EP | 0 745 924 | 12/1996 |
| EP | 0 830 000 | 7/1997 |
| EP | 0 862 104 | 9/1998 |
| EP | 0 872 792 | 10/1998 |
| EP | 0 586 903 | 4/1999 |
| EP | 0 930 774 | 7/1999 |
| EP | 1 063 597 | 12/2000 |
| EP | 1 093 288 | 4/2001 |
| EP | 1 100 003 | 5/2001 |
| EP | 1 109 113 | 6/2001 |
| EP | 1 117 271 | 7/2001 |
| EP | 1 132 839 | 9/2001 |
| EP | 1 176 500 | 1/2002 |
| EP | 1 075 138 | 9/2005 |
| EP | 0 855 835 | 3/2006 |
| FR | 2 775 406 | 2/1998 |
| GB | 2 287 623 | 9/1995 |
| GB | 2 303 478 | 2/1997 |
| GB | 2 347 766 | 9/2000 |
| JP | 63103220 | 5/1988 |
| JP | 64 86660 | 3/1989 |
| JP | 1 200865 | 8/1989 |
| JP | 5244629 | 9/1993 |
| JP | 10-069553 | 3/1998 |
| JP | 10191453 | 7/1998 |
| JP | 11 066823 | 3/1999 |
| JP | 11-313107 | 11/1999 |
| JP | 2000 053276 | 2/2000 |
| JP | 2000 066866 | 3/2000 |
| JP | 2000 099079 | 4/2000 |
| JP | 2000-207145 | 7/2000 |
| JP | 2000 222160 | 8/2000 |
| JP | 2000-312260 | 11/2000 |
| JP | 2000 339237 | 12/2000 |
| JP | 2001 076058 | 3/2001 |
| JP | 2001 103233 | 4/2001 |
| JP | 2001 118010 | 4/2001 |
| JP | 2001-167024 | 6/2001 |
| JP | 2001 236183 | 8/2001 |
| JP | 2001 245028 | 9/2001 |
| JP | 2001 249899 | 9/2001 |
| JP | 2001-256161 A | 9/2001 |
| JP | 2001 285418 | 10/2001 |
| JP | 2001 313913 | 11/2001 |
| JP | 2001 344435 | 12/2001 |
| JP | 2002-056023 | 2/2002 |
| WO | WO 95/30199 | 11/1995 |
| WO | WO 95/30199 A | 11/1995 |
| WO | WO 96/13814 | 5/1996 |
| WO | WO 98/19478 | 5/1998 |
| WO | WO 00/01138 | 1/2000 |
| WO | WO 00/48384 | 8/2000 |
| WO | WO 00/72499 | 11/2000 |
| WO | WO 01/03040 | 1/2001 |
| WO | WO 01/13307 | 2/2001 |
| WO | WO 01/16853 | 3/2001 |
| WO | WO 01/16853 A | 3/2001 |
| WO | WO 01/20509 | 3/2001 |
| WO | WO 01/50446 | 7/2001 |
| WO | WO 01/73644 | 10/2001 |
| WO | WO 01/95267 | 12/2001 |
| WO | WO 02/01451 | 1/2002 |
| WO | WO 02/08926 | 1/2002 |
| WO | WO 02/09435 | 1/2002 |
| WO | WO 02/098107 | 12/2002 |
| WO | WO 02/098124 | 12/2002 |
| WO | WO 03/052580 | 6/2003 |
| WO | WO 03/052581 | 6/2003 |
| WO | WO 03/067496 | 8/2003 |
| WO | WO 03/079279 | 9/2003 |
| WO | WO 2004/006085 | 1/2004 |
| WO | WO 2004/006155 | 1/2004 |
| WO | WO 2004/006543 | 1/2004 |

OTHER PUBLICATIONS

"ephoto Instant Photo-Messaging System" © 1998—2002 LightSurf Technologies Inc.

Xdrive.com, "Frequently Asked Questions," http://webarchive.org/web/20000408223752/http://www.xdrive.com/company/faq.html , Apr. 8, 2000, 4 pages.

Yahoo, Inc., "Yahoo! Photos—Photos Help," Yahoo! Photos, Apr. 13, 2001, 27 pages.

Bannan, "The Promise and Perils of WAP", Wireless Web Special Report, Oct. 2000, 46-49.

Bosak, "XML: The Universal Publishing Format," SGML/XML Europe 1998, May 19, 1998 1-35.

Eurotechnology, ""imode"-Eurotechnology's Short Guide To DoCoMo's Wireless Internet System," downloaded from www.eurotechnology.com., Oct. 14, 2000, 1-33.

Fung, et al. "Intelligent Meters for Improved System Operation and Customer Relationship Management," International Conference on Power System Technology, May 2002, 3, 1758-1762.

Harvey, et al., "Wireless Web Special Report, The Internet in Your Hands", Scientific American, Oct. 2000, 40-49.

International Engineering Consortium, "Wireless Application Protocol (WAP)," Web ProForum Tutorials, downloaded from http://www.iit.edu/~diazrob/wap.html, (no month available) 2007, 1-15.

Landis Communications, "National Bike Registry Teams Up With Kryptonite to Reduce Bike Theft", Business Wire, Nov. 1, 2000, 1-2.

Martin, "What Place Has CSS in the XML World", downloaded from http://www.xml.com/pub/a/2000/03/08/style/index/html, Jan. 9, 2009, XML.com, 2008, 1-3.

Meyer, "Cascading Style Sheets—The Definitive Guide", O'Reilly and Associates, Sebastopol, CA, (no month available) 2000, 1-18.

MobileMediaJapan.com, "Barcoded E-Tickets and Coupons on I-Mode", downloaded from http://www.mobilemediajapan.com/newsdesk/q-phon, May 7, 2001, 1-3.

Newsbytes.com, "Thai Govt. Prepares to Launch Online Services Getaway", Newsbytes News Network, Jul. 31, 2000, 1-2.

PCT International Preliminary Examination Report received Apr. 6, 2010, in corresponding International Application No. PCT/US02/040549.

PCT International Preliminary Examination Report received Mar. 21, 2003, in corresponding International Application No. PCT/US02/15785.

PCT International Preliminary Examination Report received Oct. 15, 2007, in corresponding International Application No. PCT/US03/02820.

PCT International Search Report mailed Aug. 18, 2004, in corresponding International Application No. PCT/US03/15557.

PCT International Search Report mailed Jan. 10, 2003, in corresponding International Application No. PCT/US02/18527.
PCT International Search Report mailed Jul. 15, 2003, in corresponding International Application No. PCT/US02/040549.
PCT International Search Report mailed Jul. 15, 2006, in corresponding International Application No. PCT/US02/40548.
PCT International Search Report mailed Jul. 30, 2002, in corresponding International Application No. PCT/US02/11354.
PCT International Search Report mailed Nov. 18, 2004, in corresponding International Application No. PCT/US03/02820.
PCT International Search Report mailed Sep. 10, 2003, in corresponding International Application No. PCT/US03/15250.
PCT International Search Report mailed Sep. 11, 2003, in corresponding International Application No. PCT/US03/07125.
PCT International Search Report mailed Sep. 12, 2003, in corresponding International Application No. PCT/US03/15556.
PCT International Search Report mailed Sep. 5, 2002, in corresponding International Application No. PCT/US02/15785.
Shah, "Presenting XML to the Web," XML J., Mar. 2000, 1(1), 18-23.
St. Pierre, et al., "Service Printer Template," The Internet Society Online, (no month available) 2000, 1-13.
Ticketmaster.com, "TicketMaster.com Order Page," Ticketmaster Entertainment, downloaded from www.ticketmaster.com, (no month available) 2009, 1-3.
U.S. Appl. No. 11/955,768, "Method and Apparatus for Printing Remote Images Using a Network-Enabled Printer," filed Dec. 13, 2007.
W2Schools.com, "Displaying XML with CSS", http://www.w2schools.com/xml/xml_display.asp, downloaded Apr. 11, 2002, 1-10.
W3C, "Extensible Markup Language (XML) 1.0 (Second Edition)," W3C Recommendation, Oct. 6, 2000, 1-40.
W3C, "XML in 10 points", downloaded from http://www.w3.org/XML/1999/XML-in-10-points, Apr. 29, 2002, 1-3.
Williams, "A Painless Guide to CRC Error Detection Algorithms," downloaded from http://www.geocities.com/SiliconValley/Pines/8659/crc.htm, Aug. 19, 1993, 1-3.
Yan, et al., "Improving Prediction of Customer Behavior in Nonstationary Environments," International Joint Conference on Neural Networks, Jul. 3, 2001, 2258-2263.

* cited by examiner

METHOD AND APPARATUS FOR UPLOADING CONTENT FROM A DEVICE TO A REMOTE NETWORK LOCATION

CROSS REFERENCE TO RELATED APPLICATIONS

This application is related to the following commonly-owned patent applications, each of which is hereby incorporated by reference herein:

application Ser. No. 09/870,561, filed on May 30, 2001, entitled "Method and Apparatus for Printing Remote Images Using a Mobile Device and Printer", now U.S. Pat. No. 6,922,258;

application Ser. No. 10/022,924, filed Dec. 18, 2001, entitled "Method and Apparatus for Printing Remote Images Using a Network-Enabled Printer", now U.S. Pat. No. 6,976,084 B2;

application Ser. No. 09/842,754, filed Apr. 26, 2001, entitled "Method And Apparatus For Remote Processing And Sharing Of Digital Images";

application Ser. No. 09/870,538, filed May 30, 2001, entitled "Method and System for Generating a Permanent Record of a Service Provided to a Mobile Device";

application Ser. No. 09/870,536, filed on May 30, 2001, entitled "Method and System for Remote Utilizing a Mobile Device to Share Data Objects";

application Ser. No. 10/024,068, filed on Dec. 18, 2001, entitled "Method and Apparatus for Providing Output from Remotely Located Digital Files Using a Mobile Device and Output Device", now abandoned and replaced by continuation application Ser. No. 11/150,948, filed Jun. 13, 2005; and application Ser. No. 10/023,245, filed Dec. 18, 2001, entitled "Method and System for Generating a Permanent Record of a Service at a Remote Printer."

BACKGROUND

1. Field of the Invention

The present invention relates to techniques for transmitting content over a communications network and, more particularly, to techniques for uploading content from a device to a remote network location.

2. Related Art

The Internet, and in particular the World Wide Web (the "Web"), is increasingly being used to store and exchange information and to perform commercial transactions. Although the Web was originally only capable of storing and displaying textual information, the Web may now be used to store, display, and exchange a wide variety of textual, graphical, and audio-visual information such as digital images and full-motion video.

Digital photography, for example, is becoming increasingly popular, spurred in large part by the advent of low-cost, high-quality digital cameras. An increasing number of web sites allow users to upload digital photographs and other digital images to the Web, whereby such images may subsequently be viewed, shared, edited, and printed on conventional printers using computers connected to the Web using conventional Internet connections.

To upload an image or other content to a web site from a mobile device (such as a digital camera), a user must typically use a conventional desktop or laptop computer to establish a Web connection using a conventional modem or other network connection device. The user then provides the content to the computer, such as by transferring the content from a floppy disk, CD, or the mobile device's memory to the computer. The user then selects a remote destination for the content. The user may, for examine, select a remote web site (such as the web site of an online photo album service) or another user as the remote destination.

The user then transmits the selected content to the selected remote destination. The transmission method that is used may vary depending on the kind of remote destination that is selected. If, for example, the remote destination is a web site, the user may transmit the content using conventional File Transfer Protocol (FTP) software or some other file transfer means. If the remote destination is an online photo album service or file storage service, the service may require the user to upload the content using the service's proprietary software or a web-based interface provided by the service. If the remote destination is another person, the user may need to use email software to transmit the content to the other person as an email attachment.

The content transmission process just described can be tedious, time-consuming, and error-prone for a variety of reasons. For example, the process described above may require the user to engage in many manual steps, use a variety of different software programs, and provide a variety of information to the computer. The process may also require the user to have a significant amount of technical knowledge and proficiency with using several different kinds of software and/or hardware. Assume, for example, that the content to be transmitted is a digital photograph stored in the memory of a digital camera. To provide the digital photograph to the computer, the user may need to physically connect the camera to the computer using a cable or other connection. Alternatively, the user may need to remove the camera's memory from the computer and insert the memory into a memory reader. To transfer the digital photograph to the computer, the user may need to initiate a "copy" operation using the computer's operating system or initiate a "transfer" operation using proprietary software associated with the user's particular digital camera.

To transmit the content to a desired remote destination, the user must typically identify the remote destination's online "address," such as a web page address or an email address. To successfully transmit information to the desired remote destination, the user must therefore keep a record of and have access to the destination's address. It can be difficult and tedious for users, particularly novice and/or casual computer users, to keep track of large numbers of online addresses. Furthermore, the user may not have access to the necessary address at a particular time if, for example, the user is traveling. For these and other reasons it may be difficult or impossible for the user to provide the remote destination's address to the computer, thereby making it difficult or impossible to transmit the content to the remote destination. Furthermore, as described above, the particular transmission method that is required to transmit particular content may vary depending on the kind of content and/or the selected remote destination. The user may, for example, need to use multiple software programs to transmit different kinds of content and/or to transmit content to multiple destinations. For example, it may be necessary to use FTP software to transmit content to web sites and to use email software to transmit content to other users. As a result, the user may need to learn how to use each such software program to transmit content to particular kinds of destinations. This can be difficult and time-consuming, particularly for novice and/or casual computer users. These problems are further compounded in the situation where the user desires to transmit particular content to multiple remote destinations simultaneously. The user may, for example, desire to transmit a digital image simultaneously to several friends and to an online photo album service for storage. In such a situation, the user may need to initiate a separate manual transmission of the content for each desired destination. The problems described above are also further compounded in the increasingly common situation in which the user desires to permanently store content at a remote location (such as an online file storage service) rather than on the hard drive of the user's computer. In such a case, the user may transmit content (such as digital photographs) to an online service and then erase, overwrite, discard, or otherwise not retain an original copy of the content locally. If the user subsequently desires to transmit some or all of the content to another remote destination, it may be necessary for the user to engage in a significant amount of tedious and time-consuming activity. If, for example, the online service at which the content is remotely stored does not provide a feature for transmitting the content to another person by email, the user may need to download the content from the online service to the user's local computer and then transmit the content to the other person using email software, which can be tedious and time-consuming for all of the reasons described above. Furthermore, the requirement that the source of the content (e.g., a digital camera) be connected to a host computer has a variety of disadvantages. For example, a mobile computer user who desires the ability to transmit content from a variety of locations (such as at home and at the office) typically must have access to a Web-connected computer in each such location. Using the techniques described above, the content source must be connected to a computer to upload content to the Web and to transmit the content to services and other users. As a result, a user who wishes to transmit such content may be required to travel with both the content source and a laptop computer, or may be limited to uploading content from locations at which a Web-connected desktop computer is available. The requirement that the content source be connected to a computer therefore limits the mobility of the user and limits the range of locations from which content may be uploaded. This may be particularly problematic when the content source is a mobile device, such as a digital camera.

What is needed, therefore, are improved techniques for uploading content from a device to a remote location.

SUMMARY

Techniques are disclosed for uploading content (such as a digital photograph) from a content upload device to a content server over a communications network, and for automatically forwarding the content from the content server to one or more remote destinations. A user of the content upload device may cause the content upload device to upload the content to the content server by initiating a single action, such as pressing a single button on the content upload device, and without providing information identifying the user to the content upload device. Upon receiving the content, the content server may add the content to a queue, referred to as a content outbox, associated with the user. The content server may automatically forward the content in the user's content outbox to one or more remote destinations specified by preferences associated with the user's content outbox. Additional aspects and embodiments of the present invention and advantages thereof will be described in more detail below.

DETAILED DESCRIPTION

Techniques are disclosed for uploading content (such as a digital photograph) from a content upload device to a content server over a communications network, and for automatically forwarding the content from the content server to one or more remote destinations. A user of the content upload device may cause the content upload device to upload the content to the content server by initiating a single action, such as pressing a single button on the content upload device, and without providing information identifying the user to the content upload device. Upon receiving the content, the content server may add the content to a queue, referred to as a content outbox, associated with the user. The content server may automatically forward the content in the user's content outbox to one or more remote destinations specified by preferences associated with the user's content outbox.

Figure 1:
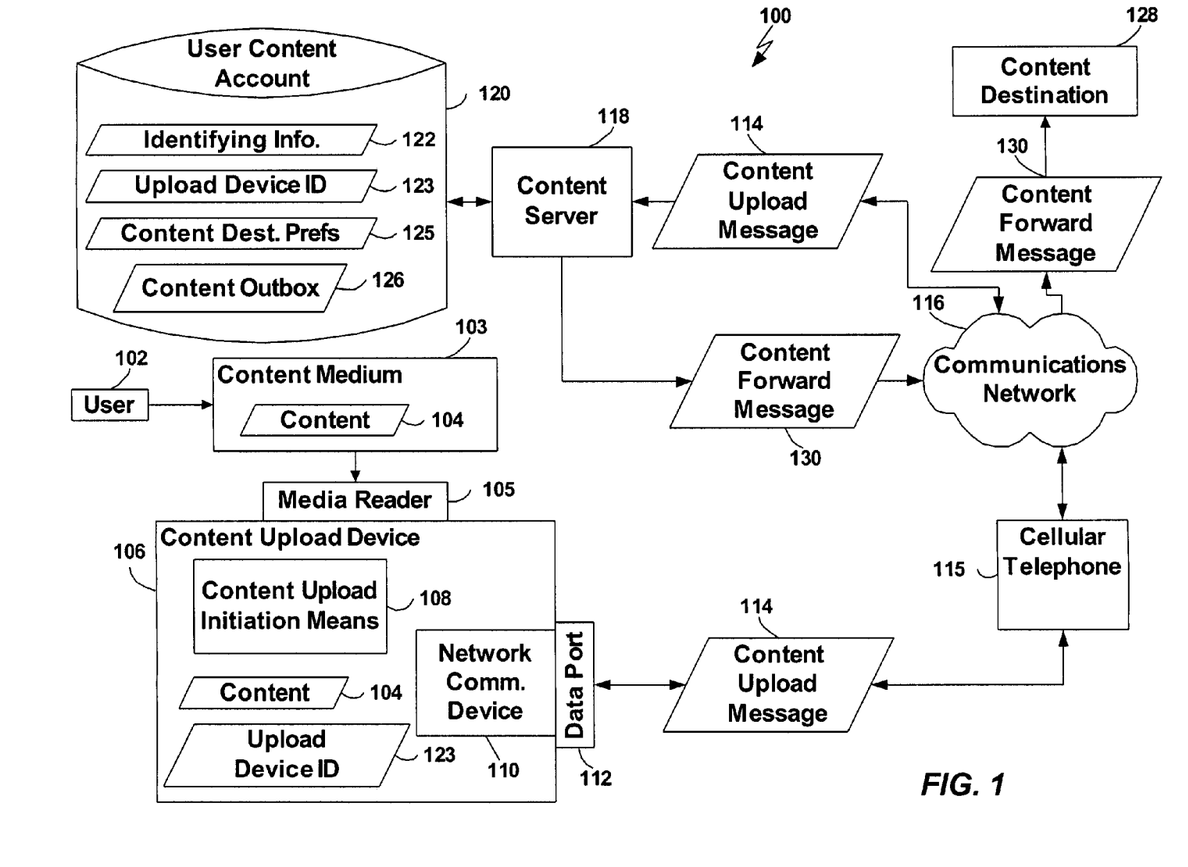
FIG. 1 is a data flow diagram of a system for uploading content from a mobile device to a content server and for forwarding the content from the content server to a content destination according to one embodiment of the present invention.

Referring to FIG. 1, a system 100 is shown which is used to upload content 104 from a content upload device 106 to a content server 118 and to forward the content 104 to a content destination 128 according to one embodiment of the present invention. The system 100 will first be described in general overview. Additional details and alternative embodiments of the system 100 will then be described.

A user 102 possesses content 104 stored on a content medium 103. The content 104 may be any kind of content, such as digital images (e.g., digital photographs captured using a digital camera), digital video (e.g., MPEG, AVI, or QuickTime® files), digital audio (e.g., MP3 files), digital text documents (e.g., word processing documents), analog text and/or images (such as printed text or conventional photographs), or any combination thereof. Although in particular examples the content 104 may be described as a single file containing information (such as a single digital photograph), it should be appreciated that the content 104 may include a plurality of files of the same or varying types. More generally, the content 104 may be any information that may be transferred to the content upload device 106.

Furthermore, the content 104 need not be generated externally to the content upload device 106. Rather, the content upload device 106 may itself generate the content 104, as in the case where the content upload device 106 is a digital camera. In such a case, it is not necessary for the user 102 to provide the content 104 to the content upload device 106.

The user 102 provides the content 104 to the content upload device 106 through a media reader 105 coupled to the content upload device 106. The media reader 105 reads the content 104 (or a portion thereof) from the content medium 103 and transfers the content 104 to the content upload device 106.

The content upload device 106 may include a memory or other storage medium in which the content 104 is stored.

The content upload device 106 establishes a network connection with a content server 118 over a communications network 116. The content upload device 106 uploads the content 104, in a content upload message 114, to the content server 118. As illustrated in FIG. 1, a data port 112 on the content upload device 106 is connected to communications network 116 through a cellular telephone 115, without the use of an intermediate host computer.

Figure 3:
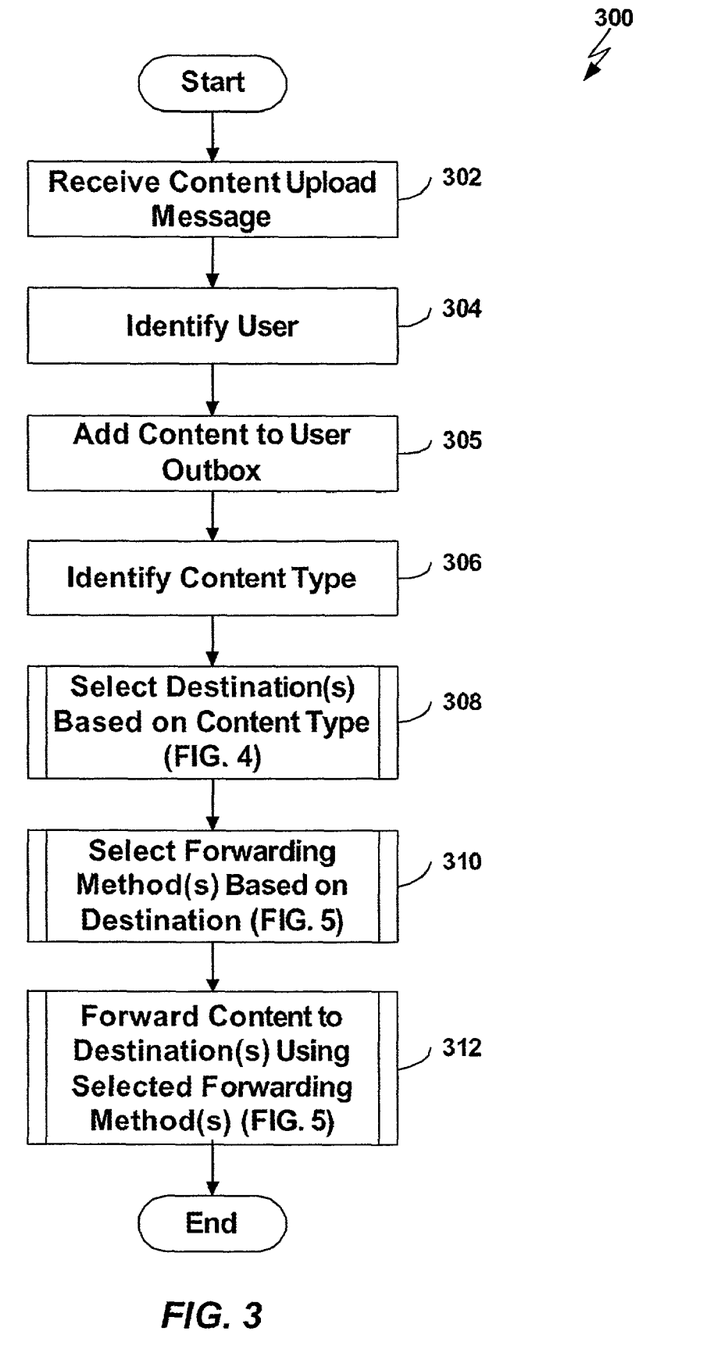
FIG. 3 is a flow chart of a method that is used by a content server to receive and automatically forward content to one or more remote destinations according to one embodiment of the present invention.

Referring to FIG. 3, a flow chart is shown of a method that is used by the content server 118 in one embodiment of the present invention to receive and automatically forward content 104 to the content destination 128. The content server 118 receives the content upload message 114 (step 302) and identifies the user 102 based on the contents of the content upload message 114 (step 304). For example, the content server 118 may identify a content account 120 associated with the user 102 based on information contained in the content upload message 114. Although the content server 118 may maintain user content accounts for a plurality of users, only the user content account 120 associated with the user 102 is shown in FIG. 1 for ease of illustration and explanation.

After identifying the user content account 120 associated with the user 102, the content server stores the content 104 in a content outbox 126 associated with the content account 120 (step 305). Additional information that is associated with the content account 120 will be described in more detail below with respect to FIG. 2. The content server 118 identifies content destination 128 and forwards (transmits) the content 104, in a content forward message 130, to the content destination 128 over the communications network 116. The content server 118 may, for example, identify a type of the content 104 (step 306) and select the content destination 128 based on the type of the content 104 (step 308). The content server 118 may select a forwarding method based on the content type or the selected content destination 128 (step 310). The content server 118 may forward the content 104 to the content destination 128 using the selected forwarding method (step 312).

Advantages of various embodiments of the system 100 will now be described briefly. In one embodiment, the user 102 may initiate uploading of the content 104 to the content server 118 using a single action. For example, the content upload device 106 may include content upload initiation means 108, such as a single button (with an appropriate label, such as "Go," "Transmit," or "Upload"). To initiate uploading of the content 104 to the content server 118, the user 102 may activate the content upload initiation means 108 (e.g., the single button), in response to which the content upload device 106 may upload the content 104 to the content server 118 without requiring any additional action by the user 102. In another embodiment, in response to activation of the content upload transmission means 108, the content upload device 106 may both transfer the content 104 from the content medium 103 to the content upload device 106 (through the media reader 105) and upload the content 104 to the content server 118. As a result, the user 102 may initiate both the transfer of the content 104 to the content upload device 106 and the upload of the content 104 to the content server 118 using a single action. Furthermore, in yet another embodiment, the content server 118 may forward the content 104 to the content destination 128 automatically, i.e., without requiring any additional action by the user 102. As a result, a single action performed by the user 102 may initiate the transfer of the content 104 to the content upload device 106, the upload of the content 104 from the content upload device 106 to the content server 118, and the forwarding of the content 104 by the content server 118 to the content destination 128.

In another embodiment, the user 102 may initiate the transfer of the content 104 to the content upload device 106 and/or the uploading of the content 104 from the content upload device 106 to the content server 118 without providing information identifying the user (such as an account name or password) to the content upload device 106 and/or the content server 118. For example, as described above, the user 102 may initiate transfer/upload of the content 104 simply by activating the content upload initiation means 108 (e.g., a single button). As described in more detail below, the content server 118 may identify the user content account 120 associated with the user 102 automatically, i.e., without requiring the user 102 to provide any personal identifying information.

As used herein, the terms "information identifying the user" and "personal identifying information" refer to information that identifies the user 102 of the device 106 apart from the device 106 itself. In the case, for example, where the device ID 123 (described below) is a serial number or other unique identifier of the device 106, the device ID 123 does not constitute "information identifying the user," even though the device ID 123 may identify the user 102 indirectly if the user 102 is the sole user of the device 106. Examples of "information identifying the user" include the user's name, address, telephone number, and social security number.

As a result of these and other features of various embodiments of the present invention, the user's experience of transferring content 104 to the content upload device 106, uploading content 104 from the content upload device 106 to the content server 118, and forwarding the content 104 to the content destination 128, is greatly simplified compared to the experience associated with conventional techniques for performing similar functions. For example, to upload the content 104 from the content upload device 106 to the content server 118, the user 102 may simply activate the content upload initiation means 108 (e.g., press a single button). The user 102 need not, in particular embodiments of the present invention, identify or input an address of the content server, input information identifying the user 102, or execute file-transfer software for transferring the content 104 to the content server 118. Rather, the content upload device 106 automatically establishes a network connection with the content server 118 and uploads the content 104 to the content server 118. As a result, the task of uploading content 104 to the content server 118 is greatly simplified and is particularly well-suited for use by novice and/or casual computer users. Similarly, in various embodiments of the present invention, forwarding of the content 104 from the content server 118 to the content destination 128 is automated, thereby relieving the user 102 of the responsibility for performing tasks that may be necessary to forward the content 104 to the content destination 128. As described in more detail below, the content server 118 may automatically select the content destination 128 based on preferences 125 previously specified by the user 102 and automatically forward the content 104 to the content destination 128 using an appropriate forwarding method.

A further advantage of various embodiments of the system 100 is that the user 102 may upload the content 104 to the content server 118 without connecting the content upload device 106 to a host computer, such as a conventional desktop or laptop computer. One advantage of this feature is that it may be possible for the user 102 to upload the content 104 from a wider variety of locations, since the user's choice of locations from which to upload the content 104 is constrained only by the mobility of the content upload device 106 and the availability of a network connection over which the content upload device 106 may connect to the content server 118. The lack of a requirement that the user 102 connect the content upload device 106 to a conventional computer may also simplify the process of uploading the content 104 to the content server 118, by eliminating the steps of physically connecting the content upload device 106 to the computer and transferring the content 104 from the content upload device 106 to the computer, and all of the potential difficulties that such steps entail.

Various embodiments of the system 100 will now be described in more detail.

The content medium 103 may be any medium that is suitable for storing the content 104. The content medium 103 may, for example, be any of a variety of kinds of input media, such as one or more PCMCIA cards, ZIP disks, compact flash cards, SmartMedia®, Memory Stick® memory, CDs, floppy disks, photographic negatives or prints, or a digital camera. The media reader 105 may be any device that is capable of reading the content 104 from the content medium 103. The media reader 105 may, for example, be a PCMCIA interface, compact flash card reader, SmartMedia® reader, Memory Stick® memory reader, CD drive, floppy disk drive, scanner, or I/O port (such as a Universal Serial Bus (USB) port or a conventional serial or parallel port). The content medium 103 may be coupled to the media reader 105 in any manner, such as by a cable connection, network connection, or by inserting the content medium 103 into an appropriate interface on the media reader 105, as in the case of floppy disks and CDs.

The media reader 105 may be internal or external to the content upload device 106. Furthermore, the media reader 105 may be permanently or temporarily coupled to the content upload device 106 using any kind of connection. In one embodiment, for example, the content upload device 106 is itself a media reader (such as a digital camera memory reader) that has been modified to include means for uploading the content 104 to the content server 118 using the techniques described herein.

The content upload device 106 may be any kind of mobile device, such as a mobile printer, digital camera, Personal Digital Assistant (PDA), cellular telephone, or any combination thereof. The content upload device 106 need not, however, be a mobile device. The content upload device 106 may, for example, be a conventional computer, such as a conventional desktop or laptop computer. Although implementing the content upload device 106 as a conventional computer may limit the mobility of the content upload device 106, in such cases the content upload device 106 may still operate advantageously in conjunction with features of various embodiments of the present invention, such as the ability to upload content 104 which is automatically forwarded by the content server 118 to the remote content destination 118.

As shown in FIG. 1, the content upload device 106 is connected to communications network 116 through cellular telephone 115, which may perform the functions of a conventional modem on behalf of the content upload device 106. Devices other than cellular telephone 115 may be used to perform the same functions, such as a conventional analog modem, cable modem, Digital Subscriber Line (DSL) modem, or network interface card (NIC). Network communications device 110 may perform minimal communications functions, such as compressing and serially transmitting content 104 to cellular telephone 115, since cellular telephone 115 is responsible for performing the more substantial task of uploading the content 104 on behalf of the content upload device 106. The network communications device 110 may also be omitted entirely from the content upload device 106.

Alternatively, the content upload device 106 may communication over the network 116 directly through the data port 112, without the use of the cellular telephone 115. In such a case, network communications device 110 may be any kind of communications device, such as a conventional analog modem, cable modem, Digital Subscriber Line (DSL) modem, or network interface card (NIC). The network communications device 110 may be either internal or external to the content upload device 106, so long as the content upload device 106 includes a controller suitable for using the network communications device 110 to communicate over the communications network 116.

The content upload device 106 may establish a connection to the content server 118 in any of a variety of ways. For example, consider one embodiment in which the communications network 116 is a cellular telephone network. The content upload device 106 may initiate a connection with the content server 118 over the network 116 by instructing the cellular telephone to dial a predetermined telephone number associated with the content server 118. The content server 118 may be equipped with a corresponding modem that answers the telephone call placed by the cellular telephone 115. The content server 118 and cellular telephone 115 may then negotiate and establish a connection over the network 116 in any of a variety of ways that are well-known to those of ordinary skill in the art. Alternatively, the content upload device 106 may instruct the cellular telephone 115 to call a predetermined toll-free telephone number to connect to a computer (not shown) that may provide the content upload device 106 with a telephone number or other address of the content server 118. Techniques for locating the content server 118 in this manner are described in more detail in the above-referenced patent application entitled "Method and Apparatus for Remote Processing and Sharing of Digital Images."

The content upload device 106 may obtain the telephone number for the content server 118 in any of a variety of ways. For example, upon activation of the content upload initiation means 108, the content upload device 106 may prompt the user 102 for the content server's telephone number, which the user 102 may then enter through a keypad on the content upload device 106. Alternatively, for example, the content upload device 106 may allow the user 102 to pre-configure the content upload device 106 with the telephone number or Internet address of the content server 118 so that the content upload device 106 may automatically connect to the content server 118 without having to prompt the user for such information each time the content upload device 106 uploads content to the content server 118.

In any case, the content upload device 106 may store the telephone number or other addressing information for the content server 118 in a ROM, RAM, flash memory, or other storage medium.

As shown in FIG. 1, the content upload device 106 includes a content upload device identifier (ID) 123 which identifies the content upload device 106. As described in more detail in the above-referenced patent application entitled "Product Registration System," the device ID 123 may, for example, be: (1) a serial number or other identifier assigned to the content upload device 106 at the time of manufacture, or (2) an identifier previously assigned to the content upload device 106 by the content server 118. The content upload device ID 123 may be stored, for example, in a ROM, EPROM, or flash memory.

As shown in FIG. 1, the content upload device 106 includes a copy of the content 104. It should be appreciated, however, that this is not a requirement of the present invention. The content upload device 106 may, for example, upload the content 104 to the content server 118 "on the fly" as the content 104 is being transferred from the content medium 103 to the content upload device 106, in which case a copy of the entire content 104 may not be stored in the content upload device 106 at any one time. Furthermore, less than all of the content 104 in the content medium 103 may be transferred to the content upload device 106. The content 104 may be stored in the content upload device 106 in any kind of storage medium, such as RAM or on a hard disk. The content 104 may be erased from the content upload device 106 after it has been transmitted to the content server 118.

As described above, some or all of the content 104 may be transferred from the content medium 103 to the content upload device 106. The content upload device 106 may, for example, include means (not shown) that allow the user to select particular portions of the content 104 (e.g., particular digital photographs) to transfer to the content upload device 106.

Figure 4:
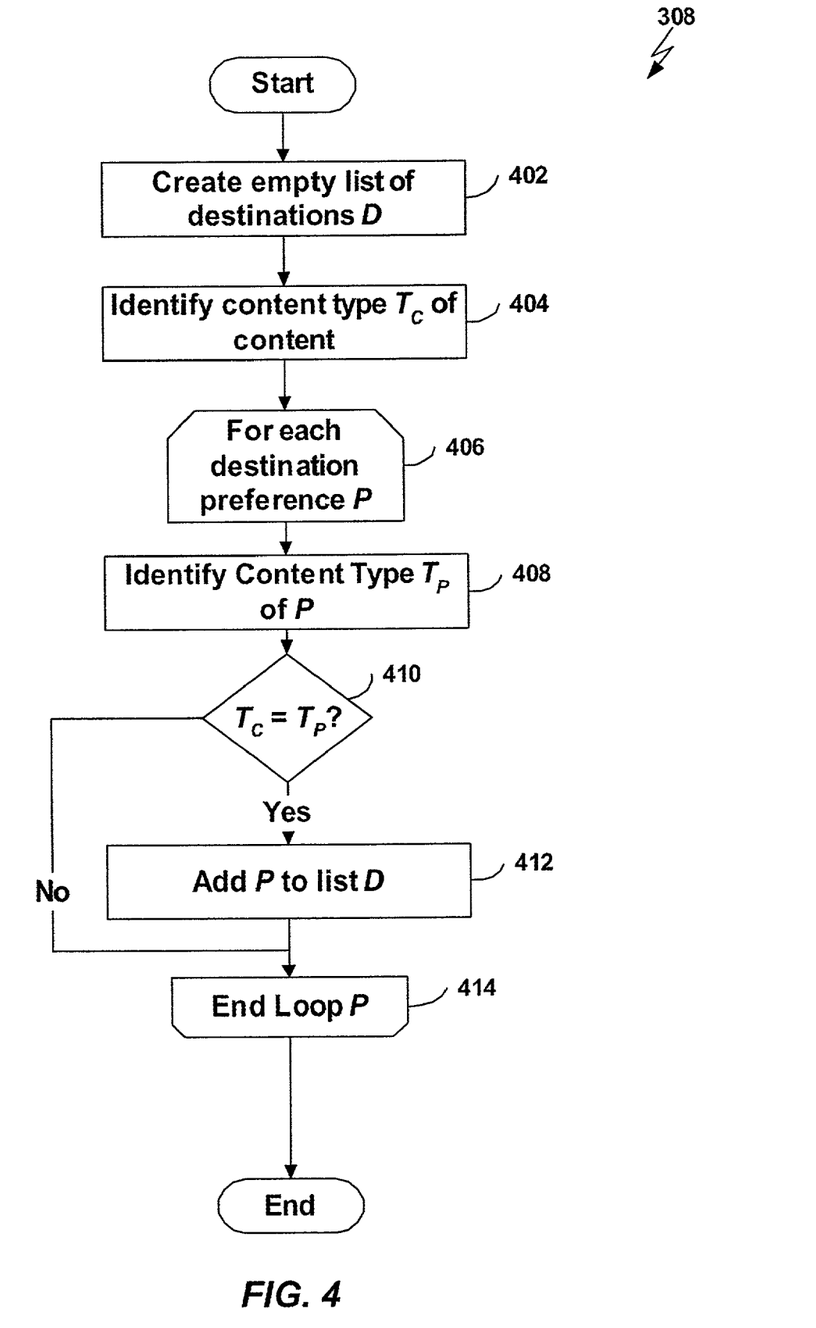
FIG. 4 is a flow chart of a method that is used by a content server to select one or more remote destinations for content based on the type of the content according to one embodiment of the present invention.

The content upload message 114, which contains some or all of the content 104 provided by the user, may be formatted and transmitted according to any appropriate network communications protocol, such as the File Transfer Protocol (FTP) or the Hypertext Transfer Protocol (HTTP). Examples of techniques that may be used to upload images to the content server 118 are described in more detail in above-referenced patent application entitled "Method and System for Remote Utilizing a Mobile Device to Share Data Objects." The communications network 116 may be any network or combination of networks. For example, the communications network may be a POTS network, wireless network, Local Area Network (LAN), Wide Area Network (WAN), or an internet such as the public Internet. The content upload device 106, content server 118, and content destination 128 need not all communicate over the same network. The single communications network 116 is shown in FIGS. 1 and 4 merely for ease of illustration.

The content server 118 may be implemented in hardware, software, firmware, or any combination thereof. For example, the content server 118 may be implemented in software executing on a computer accessible over the communications network 116. The content server 118 need not be a "server" according to a client-server architecture. Rather, the content server 118 may be implemented using any means for performing the functions described herein.

Figure 2:
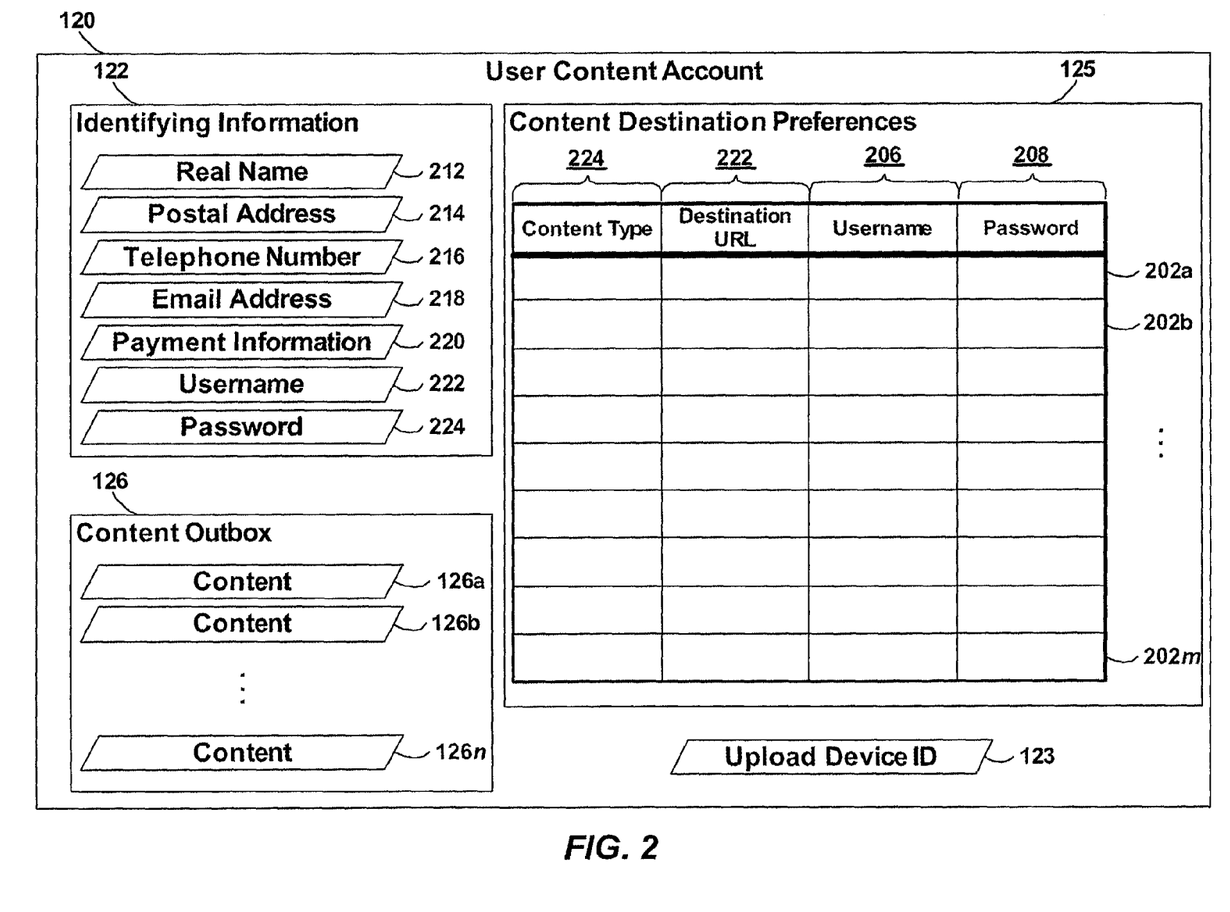
FIG. 2 is a block diagram of a user content account according to one embodiment of the present invention.

Referring to FIG. 2, operation of the system 100 will now be described in more detail with respect to features of the user content account 120 according to one embodiment of the present invention. As described above, the user content account 120 contains information related to a content account that is associated with the user 102 and maintained by the content server 118. The content server 118 may be associated with a content service which allows users (such as the user 102) to upload, download, and share content. The content service may, for example, be a service for storing, printing, and sharing digital photographs. The service may also provide a web site or other interface through which the user 102 may access and modify information stored in the user content account 120.

The user content account 120 includes information 122 identifying the user 102, such as the user's real name 212, postal address 214, telephone number 216 (e.g., the telephone number of the cellular telephone 115), email address 218, payment information 220 (such as a credit card number and expiration date), user name 222, and password 224. The particular identifying information 122 shown in FIG. 2 is provided merely for purposes of example and does not constitute a limitation of the present invention. Rather, the identifying information 122 may be any information that is used by the content server 118 to distinguish the user 102 from other users.

The user content account 120 also include the content upload device ID 123 of the content upload device 106. As described in more detail in the above-referenced patent application entitled "Product Registration System," the content server 118 may associate one or more content upload device IDs with each user content account. The content upload device ID 123 may be obtained and recorded in the user content account 120 when the user content account 120 is created.

As described above, in one embodiment the content server 118 identifies the user 102 that is associated with the content upload device 106 when the content server 118 receives the content upload message 114 (FIG. 3, steps 302 and 304). In one embodiment, the content server 118 identifies the user 102 as follows. The content upload device 106 provides the content upload device ID 123 in the content upload message 114 that is transmitted to the content server 118. Upon receiving the content upload message 114, the content server 118 extracts the content upload device ID 123 from the content upload message 114 and searches through the user content accounts (not shown) to identify the user content account that includes the content upload device ID 123. The content server 118 determines that the identified user content account is the user content account that is associated with the user 102. The content server 118 may thereby use the content upload device ID 123 transmitted by the content upload device 106 to identify the user 102 without requiring the user to transmit personal identifying information (such as the username 222 and/or password 224) each time the user uploads content to the content server 118. Although the user 102 may need to provide such personal identifying information once, such as at the time of the creation of the user content account 120, the user 102 need not provide such information again because the content upload device ID 123 serves as a key to the user content account 120. In an alternative embodiment, the content upload device ID 123 may be any identifier that uniquely identifies the user 102. As a result, if the user 102 owns and/or uses multiple devices, each such device may share a common device ID that is associated with the user and that the content server 118 may use to identify the user 102 as described above.

Alternatively, the content server 118 may use caller ID messages (not shown) to identify the telephone number 216 associated with the content upload device 106 and thereby identify the user 102, as described in more detail in the above-referenced patent application entitled "Method and Apparatus for Printing Remote Images Using a Mobile Device and Printer." In such a case, the telephone number 216 acts as a unique identifier of the user 102.

Although in certain embodiments of the present invention the content upload device 106 does not transmit information identifying the user 102 to the content server 118, this is not a requirement of the present invention. Rather, the content upload device 106 may store and transmit information identifying the user 102, such as the user's username 222 and password 224, to the content server 118. The content server 118 may identify the user 102 based on such information. The content server 118 may also automatically log the user in to the user content account 120 using such information.

As shown in FIG. 2, the user content account 120 includes content outbox 126. The content outbox 126 may, for example, include content (such as content 104) that has been uploaded by the user 102 from the content upload device 106. The content outbox 126 may, however, include other content.

For example, the content outbox 126 may include content generated as a result of a transaction involving the user 102. If, for example, the user 102 purchased a movie ticket using an online movie ticket purchasing service (such as AOL Moviefone®), the ticket purchasing service may transmit a digital version of the movie ticket to the content server 118, which may store the digital movie ticket in the content outbox 126. In this way, the content outbox 126 may serve not only as an outbox, but as an inbox, as described in more detail in the above-referenced patent application entitled "Method and Apparatus for Printing Remote Images Using a Network-Enabled Printer." Alternatively, the user's outbox 126 and inbox may be distinct.

As mentioned above, when the content server 118 receives the content 104 (in the content upload message 114), the content server 118 stores the content in the content outbox 126 (FIG. 3, step 305). As shown in FIG. 2, the content outbox 126 may include a plurality of content 126a-n. The content server 118 may, for example, add each piece of content that it receives in a first-in first-out (FIFO) queue in the content outbox 126.

As described above, the content server 118 forwards the content 104 to the content destination 128 (FIG. 3, step 312). More specifically, the content server 118 may transmit the content 126a-n in the content outbox 126 in the order in which they were received, or in any other order. The content server 118 may delete content from the content outbox 126 as it is transmitted to the content destination 128. In other words, the content outbox 126 may serve as a temporary content store which is used to store content only until it is forwarded to the content destination 128.

The content server 118 may accumulate content in the content outbox 126 until the occurrence of a particular event. For example, the content server 118 may accumulate content that it receives until the user 102 instructs the content server 118 (using, for example, a web-based interface) to transmit some or all of the content 126a-n in the content outbox 126 to the content destination 128. Alternatively, the content server 118 may automatically forward any content that it receives (such as content 104) to the content destination 128 without waiting for any instruction from the user 102.

It should be appreciated that the content upload device 106 and/or the content server 118 may perform various kinds of processing on the content 104. Such processing may include, for example, compressing the content 104, encrypting the content 104, and performing image processing on the content 104, such as changing the spatial resolution and/or color depth of the content 104 to make it suitable for printing on a mobile printer. Examples of various kinds of processing that may be performed on the content 104 are described in more detail in the above-referenced patent application entitled "Method and Apparatus for Printing Remote Images Using a Mobile Device and Printer."

As mentioned above, the content server 118 may automatically select one or more content destinations for the content 104 (FIG. 3, step 308). Although only one content destination 128 is shown in FIG. 2, this is not a limitation of the present invention. Rather, the content server 118 may select multiple content destinations and forward the content 104 to the multiple selected destinations. Therefore, any discussion herein which refers to the content destination 128 should be understood to apply equally to the use of multiple content destinations.

The content server 118 may, for example, select the content destination 128 based on the type of the content 104. For example, if the content 104 is a text document (such as a Microsoft Word® word processing file), the content server 118 may select an email recipient as the content destination 128. If, however, the content 104 is a digital image, the content server 118 may select a digital image storage service as the content destination 128. From these examples it should be appreciated that the content server 118 may also select a forwarding method (e.g., email or file transfer) based on the content type.

Techniques which the content server 118 may use to select the content destination 128 and/or content forwarding method will now be described in more detail. Referring again to FIG. 2, the user content account 120 includes content destination preferences 125. In general, the content destination preferences 125 specify the preferred content destinations and/or forwarding methods that the content server 118 is to apply to content 126a-n stored in the user's content outbox 126. In the particular embodiment illustrated in FIG. 2, the content destination preferences 125 are implemented as a table having a plurality of rows 202a-m, wherein each row contains a record specifying preferences associated with a particular content type. Each record includes a content type 224, which indicates the type of content to which the record corresponds. Content types may be specified in any way, such as by using filename extensions (e.g., "doc", "jpg", "avi") corresponding to file types suitable for storing particular types of content. The remaining fields in each record provide information about the particular content destination to which the record corresponds.

Referring to FIG. 4, a flowchart is shown of a method that is used by the content server 118 to select one or more remote destinations (such as content destination 128) for the content 104 based on the type of the content 104 according to one embodiment of the present invention. The content server 118 creates an empty list of content destinations D for the content 104 (step 402). The content server 118 identifies the type $T_C$ of the content 104 (step 404), such as by examining the filename extension of the file in which the content 104 is stored and identifying the type of the content 104 by reference to a pre-configured table which maps filename extensions to content types.

The content server 118 searches through the rows 202a-m of the content destination preferences 125 to identify one or more records corresponding to the type of the content 104. More specifically, the content server 118 enters into a loop over each destination preference P in the content destination preferences 125 (step 406). The content server identifies the content type $T_P$ of preference P by reference to the content type 224 shown in FIG. 2 (step 408). If the content type $T_P$ stored in preference P is the same as the content type $T_C$ of the content 104 (step 410), then the preference P contains a destination to which content of type $T_C$ should be forwarded, and the content server 118 adds the contents of preference P to the list D of content destinations (step 412). Content server 118 repeats steps 408-412 for each of the remaining preferences P in the content destination preferences 125 (step 414). Upon completion of the process 308 shown in FIG. 4, the list D contains the destination(s) that the content destination preferences 125 associate with the content type of the content 104.

Figure 5:
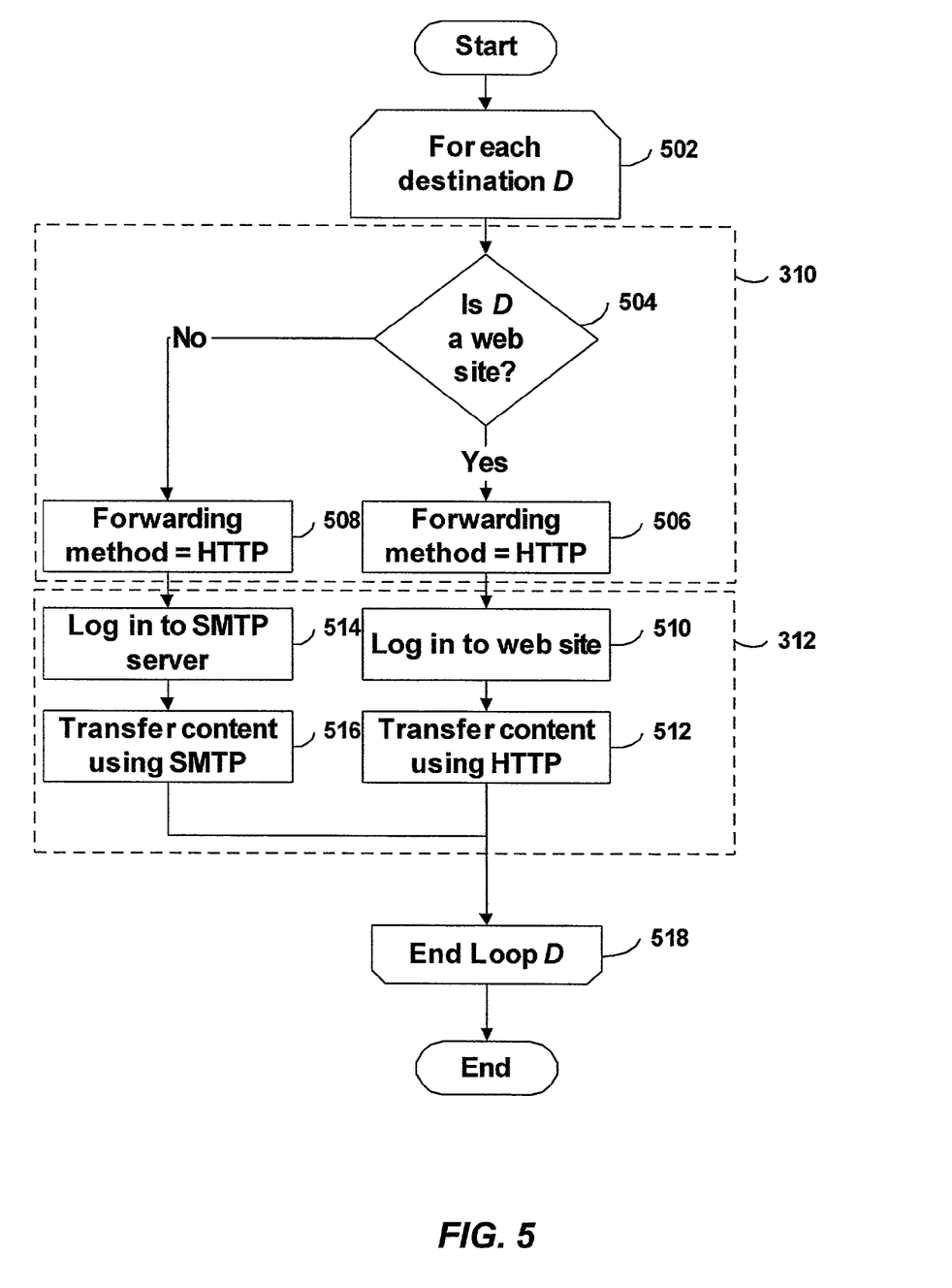
FIG. 5 is a flow chart of a method that is used by a content server to forward content to one or more remote destinations according to one embodiment of the present invention.

The content server 118 may also select a forwarding method to use to forward the content 104 to the destination(s) selected in step 308. For example, as shown in FIG. 2, each record in the content destination preferences 125 may include a URL field 222, which specifies a URL of the corresponding content destination. Such a URL may, for example, be a web site address or an email address. Referring to FIG. 5, a flow chart is shown of a method that is used by the content server 118 to select one or more forwarding methods to use to forward the content 104 to the destinations selected in step 308, and to forward the content 104 to the destinations using the selected forwarding method(s).

For each destination D (step 502), the content server 118 determines whether the destination is a web site (step 504). The content server 118 may perform this step by, for example, examining the URL field 222 (FIG. 2) of the destination. If the destination D is a web site, then the content server 118 selects the HyperText Transfer Protocol (HTTP) as the forwarding method (step 506); otherwise, the content server 118 selects the Simple Mail Transfer Protocol (SMTP) as the forwarding method (step 508). Although the process shown in FIG. 5 only supports two forwarding methods, additional forwarding methods, such as the File Transfer Protocol (FTP) may also be supported.

If the destination D is a web site, the content server 118 forwards the content 104 to the web site by logging in to the web site using the username 206 and password 208 associated with the destination D (step 510), if necessary, and transferring the content 104 to the web site using HTTP (step 512). The content destination 128 may, for example, be a web site of a service, such as an online digital photo album service, with which the user 102 has a separate account (i.e., an account that is distinct from the user's content account 120). If the destination D is not a web site (e.g., if the destination D is an email address), the content server 118 forwards the content 104 to the email address by logging in to the user's SMTP account using the username 206 and password 208 associated with the destination D, and by transmitting the content 104 to the email address as an email message or an email attachment using SMTP (step 516). The content server 118 by store an IP address (not shown) for the user's SMTP account for use in step 514.

Content server 118 repeats steps 504-516 for each destination D (step 518), thereby forwarding the content 104 to each of the destinations using an appropriate forwarding method.

It should be appreciated that each content type 224 may be associated with either a single content destination or with multiple content destinations. If the content type of the content 104 is associated with multiple content destinations, the content server 118 may forward the content 104 to each of the multiple content destinations. The user 102 may, for example, prefer that digital photographs be forwarded both to an online photo album service and to a preselected group of family members.

The content destination preferences 125 may be editable by the user 102. The service associated with the content server 118 may, for example, provide proprietary software and/or a web-based interface which allows the user to modify the content destination preferences 120. Such an interface may, for example, allow the user 102 to edit the URL 222, username 206, and password 208 that is associated with each content type.

The particular content destination preferences 125 shown in FIG. 2 are provided merely for purposes of example and do not constitute limitations of the present invention. Rather, the content server 118 may select one or more content destinations 128 in any manner, and the content destination preferences 125 are not limited to implementation using any particular data structure or to the use of any particular fields.

One advantage of the system 100 described above is that the "intelligence" of the system 100 may be provided entirely or primarily in the content server 118, rather than in the user 102, the content upload device 106, and/or the content destination 128. For example, as described above, the content upload device 106 may automatically establish a network connection with the content server 118 and automatically upload the content 104 to the content server 118, thereby relieving the user 102 of the responsibility for providing a network address for the content server 118, establishing a network connection with the content server 118, providing a username and/or password to the content server 118, and performing other tasks typically associated with uploading content to remote locations over the Internet.

Similarly, as described above, the content server 118 may automatically select the content destination 128, select a forwarding method for forwarding the content 104 to the content destination 128, and performing the actual forwarding of the content 104 to the content destination. This relieves both the user 102 and the content upload device 106 of the responsibility for performing such tasks. In particular, placement of such functionality in the content server 118 may enable the content upload device 106 to be implemented as a small, mobile, and inexpensive device with relatively little hardware and/or software. In various embodiments of the present invention the content upload device 106 may include only simple network communications capabilities, such as the ability to serially transmit the content 104 to the cellular telephone 115, rather than the kinds of extensive networking and processing capabilities that are typically provided by conventional desktop and laptop computers.

A further advantage of various embodiments of the system 100 is that the user 102 may use the content upload device 106 to upload content from a variety of content sources, such as digital cameras, scanners, video cameras, and still photographs. The user 102 may use the content upload device 106 to upload content from such sources even if such sources are not themselves capable of communicating over the network, since the content upload device 106 provides the necessary network communication capabilities.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

The content upload device 106 is described herein as performing various functions, such as receiving the content 104 from the content medium 103 and uploading the content 104 to the content server 118. It should be appreciated that such functionality may be implemented within the content upload device 106 in any manner, such as by using hardware, software, firmware, or any combination thereof. In general, a device "controller" refers herein generally to any such subsystem(s) of the content upload device 106 that perform the functions described herein.

The content upload device 106 may also be configured to download content from the content server 118 and to print such content, as described in more detail in the above-referenced patent application entitled "Method and Apparatus for Printing Remote Images Using a Network-Enabled Printer." The content upload device 106 may, for example, include a content download initiation means (not shown), such as a button labeled "Print" or "Download" in addition to the content upload initiation means. The single content upload device 106 may therefore be used both to upload and to download content.

The term "connection" as used herein (e.g., a connection between content upload device 106 and content server 118) refers to any kind of connection that enables communication between or among two or more devices. For example, a "connection" may be a physical and/or logical connection enabled by any combination of wired and/or wireless networks. Although examples are provided above in which content 104 is uploaded to the content server 118 in response to actions performed by the user 102, this is not a limitation of the present invention. Rather, content 104 may be automatically uploaded without any prompting by the user 102. For example, the content upload device 106 may automatically upload the content 104 to the content server 118 upon establishment of a network connection between the content upload device 106 and the content server 118. Such a connection may be established automatically when, for example, the content upload device 106 enters the range of a wireless network through which the content server 118 is accessible. In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and nonvolatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below. Other embodiments that fall within the scope of the following claims includes include, but are not limited to, the following.

What is claimed is:

1. A computer-implemented method comprising:
receiving a content message from a content upload device via a communications network, the content message comprising a content file and an identifier of a content upload device;
automatically identifying a user identifier associated with the identifier of the content upload device;
automatically storing the content file in a particular queue associated with the user identifier;
automatically accessing a plurality of user preferences corresponding to the user identifier, each of the plurality of user preferences comprising an association of a content file type with an external content destination;
automatically determining at least one external content destination from the plurality of user preferences based on a file type of the content file, wherein the file type of the content file is associated with the at least one external content destination in at least one of the plurality of user preferences; and
automatically transmitting the content file to the at least one external content destination;
wherein the automatically identifying, the automatically storing, the automatically accessing, the automatically determining, and the automatically transmitting are performed without user intervention.

2. The method of claim 1, wherein the content upload device requires performance of only a single action to transmit the content message.

3. The method of claim 2, wherein the single action comprises pressing a single button.

4. The method of claim 1, wherein the content message lacks information identifying the user identifier.

5. The method of claim 1, wherein the content upload device comprises a digital camera memory reader.

6. The method of claim 1, wherein the content upload device comprises a mobile printer.

7. The method of claim 1, wherein the content upload device comprises a cellular telephone.

8. The method of claim 1, further comprising:
prior to automatically transmitting the content file, selecting a transmitting method based on the file type of the content file;
wherein the content file is automatically transmitted to the at least one external content destination using the transmitting method.

9. The method of claim 8, wherein the transmitting method comprises a method for transmitting the content file according to the HyperText Transfer Protocol.

10. The method of claim 8, wherein the transmitting method comprises a method for transmitting the content file according to the Simple Mail Transfer Protocol.

11. A content server comprising:
means for receiving a content message from a content upload device over a communications network, the content message comprising a content file and an identifier of a content upload device;
means for automatically identifying a user identifier associated with the identifier of the content upload device;
means for automatically storing the content file in a particular queue associated with the user identifier;
means for automatically accessing a plurality of user preferences corresponding to the user identifier, each of the plurality of user preferences comprising an association of a content file type with an external content destination;
means for automatically determining at least one external content destination from the plurality of user preferences based on a file type of the content file, wherein the file type of the content file is associated with the at least one external content destination in at least one of the plurality of user preferences; and
means for automatically transmitting the content file to the at least one external content destination;
wherein the means for automatically identifying, the means for automatically storing, the means for automatically accessing, the means for automatically determining, and the means for automatically transmitting are configured to operate without user intervention.

12. The content server of claim 11, wherein the content message lacks information identifying the user identifier.

13. The content server of claim 11, further comprising:
means for selecting a transmitting method based on the file type of the content file;
wherein the means for automatically transmitting the content file comprises means for automatically transmitting the content file using the transmitting method.

14. The content server of claim 13, wherein the transmitting method comprises a method for forwarding the content file according to the HyperText Transfer Protocol.

15. The content server of claim 13, wherein the transmitting method comprises a method for forwarding the content file according to the Simple Mail Transfer Protocol.

16. A computer-readable storage medium having computer-readable instructions tangibly embodied thereon, the instructions comprising:
    instructions for receiving a content message from a content upload device via a communications network, the content message comprising a content file and an identifier of a content upload device;
    instructions for automatically identifying a user identifier associated with the identifier of the content upload device;
    instructions for automatically storing the content file in a particular queue associated with the user identifier;
    instructions for automatically accessing a plurality of user preferences corresponding to the user identifier, each of the plurality of user preferences comprising an association of a content file type with an external content destination;
    instructions for automatically determining at least one external content destination from the plurality of user preferences based on a file type of the content file, wherein the file type of the content file is associated with the at least one external content destination in at least one of the plurality of user preferences; and
    instructions for automatically transmitting the content file to the at least one external content destination;
    wherein the automatically identifying, the automatically storing, the automatically accessing, the automatically determining, and the automatically transmitting are performed without user intervention.

17. A computer-implemented method for use by a content upload device to send a content file to at least one external content destination, the method comprising:
    receiving an input to send a content message, the content message comprising a content file; and
    transmitting the content message via a communications network to a content server;
    wherein the content server is configured to do the following automatically after receiving the content message:
        access a plurality of user preferences corresponding to a user identifier associated with the content upload device, each of the plurality of user preferences comprising an association of a content file type with an external content destination,
        determine at least one external content destination from the plurality of user preferences based on a file type of the content file, wherein the file type of the content file is associated with the at least one external content destination in at least one of the plurality of user preferences, and
        transmit the content file to the at least one external content destination,
        wherein the content server is configured to access the plurality of user preferences, to determine the at least one external content destination, and to transmit the content file without user intervention.

18. The method of claim 17, wherein the input is inputted by performance of only a single action.

19. The method of claim 18, wherein the single action comprises pressing a single button.

20. The method of claim 17, wherein the input lacks the user identifier.

21. The method of claim 17, wherein the content upload device comprises a digital camera memory reader.

22. The method of claim 17, wherein the content upload device comprises a mobile printer.

23. The method of claim 17, wherein the content upload device comprises a cellular telephone.

24. The method of claim 17, wherein the content message comprises an identifier of the content upload device.

25. A content upload device for use in transmitting a content file to at least one external content destination, the device comprising:
    means for receiving input to send a content message, the content message comprising a content file; and
    means for transmitting the content message via a communications network to a content server;
    wherein the content server is configured to do the following automatically after receiving the content message:
        access a plurality of user preferences corresponding to a user identifier associated with the content upload device, each of the plurality of user preferences comprising an association of a content file type with an external content destination,
        determine at least one external content destination from the plurality of user preferences based on a file type of the content file, wherein the file type of the content file is associated with the at least one external content destination in at least one of the plurality of user preferences, and
        transmit the content file to the at least one external content destination,
        wherein the content server is configured to access the plurality of user preferences, to determine the at least one external content destination, and to transmit the content file without user intervention.

26. The content upload device of claim 25, wherein the means for receiving input comprises means for receiving input representing only a single action.

27. The content upload device of claim 26, wherein the single action comprises pressing a single button.

28. The content upload device of claim 25, wherein the means for receiving input comprises means for receiving input that lacks the user identifier.

29. The content upload device of claim 25, wherein the content upload device comprises a digital camera memory reader.

30. The content upload device of claim 25, wherein the content upload device comprises a mobile printer.

31. The content upload device of claim 25, wherein the content upload device comprises a cellular telephone.

32. A content upload device for use in transmitting a content file to at least one external content destination, the content upload device comprising:
    a content medium comprising the content file;
    a media reader coupled to the content medium and configured to read the content file from the content medium;
    an input mechanism configured to receive an input;
    a transmitter configured to transmit a content upload message via a communications network to a content server in response to receiving the input, the content upload message comprising the content file;
    wherein the content server is configured to do the following automatically after receiving the content message:
        access a plurality of user preferences corresponding to a user identifier associated with the content upload device, each of the plurality of user preferences comprising an association of a content file type with an external content destination, determine at least one external content destination from the plurality of user preferences based on a file type of the content file, wherein the file type of the content file is associated with the at least one external content destination in at least one of the plurality of user preferences, and transmit the content file to the at least one external content destination, wherein the content server is configured to access the plurality of user preferences, to determine the at least one external content destination, and to transmit the content file without user intervention.

33. The content upload device of claim 32, wherein the content upload device is a mobile printer, digital camera, Personal Digital Assistant (PDA), cellular telephone, desktop computer, laptop computer, or any combination thereof.

34. The content upload device of claim 32, wherein the content medium is a medium selected from the group consisting of a PCMCIA card, ZIP disk, compact flash card, flash memory card medium, integrated circuit recording medium, CD, floppy disk, photographic negative, photographic print, digital camera, and combinations thereof.

35. The content upload device of claim 32, wherein the media reader is a reader selected from the group consisting of a PCMCIA interface, compact flash card reader, flash memory card reader, integrated circuit recording memory reader, CD drive, floppy disk drive, scanner, I/O port, and combinations thereof.

36. A computer-readable storage medium having computer-readable instructions tangibly embodied thereon, the instructions comprising:

instructions for receiving an input to send a content message, the content message comprising a content file; and instructions for transmitting the content message via a communications network to a content server;

wherein the content server is configured to do the following automatically after receiving the content message:

access a plurality of user preferences corresponding to a user identifier associated with the content upload device, each of the plurality of user preferences comprising an association of a content file type with an external content destination, determine at least one external content destination from the plurality of user preferences based on a file type of the content file, wherein the file type of the content file is associated with the at least one external content destination in at least one of the plurality of user preferences, and transmit the content file to the at least one external content destination, wherein the content server is configured to access the plurality of user preferences, to determine the at least one external content destination, and to transmit the content file without user intervention.

\* \* \* \* \*